United States Patent [19]

Wallin

[11] Patent Number: 4,729,479

[45] Date of Patent: Mar. 8, 1988

[54] CASSETTE TAPE HOLDER

[76] Inventor: Lawrence Wallin, P.O. Box 2375, Tisdale, Saskatchewan, Canada, S0E 1T0

[21] Appl. No.: 929,378

[22] Filed: Nov. 12, 1986

[30] Foreign Application Priority Data

Nov. 13, 1985 [CA] Canada .................................. 495176

[51] Int. Cl.⁴ .............................................. A47G 19/08
[52] U.S. Cl. ......................................... 211/41; 211/71
[58] Field of Search ....................... 211/41, 42, 71, 72, 211/13, 89, 126, 4, 40, 162; 206/387; 312/9, 10

[56] References Cited

U.S. PATENT DOCUMENTS

| | | |
|---|---|---|
| 1,518,216 | 12/1924 | Onody ..................................... 211/41 |
| 2,066,825 | 1/1937 | Cohen ................................. 211/41 X |
| 2,222,831 | 11/1940 | Bitney ................................ 211/41 X |
| 3,200,957 | 8/1965 | Morin ................................. 211/71 X |
| 3,452,878 | 7/1969 | Smith . | 
| 3,454,019 | 7/1969 | Leedy ................................ 211/41 X |
| 3,847,316 | 11/1974 | McInnes . |
| 3,856,192 | 12/1974 | Nelson . |
| 3,907,116 | 9/1975 | Wolf . |
| 4,257,524 | 3/1981 | Yonkers et al. ........................ 211/71 |
| 4,270,660 | 6/1981 | Putt .................................. 211/41 X |

FOREIGN PATENT DOCUMENTS 1052337 10/1979 Canada .

Primary Examiner—Ramon S. Britts
Assistant Examiner—Sarah A. Lechok Elay
Attorney, Agent, or Firm—Willian Brinks Olds Hofer Gilson & Lione

[57] ABSTRACT

A device for attachment to the roof of vehicle for holding tape cassette boxes. The device consists of a base and plurality of arms attached to the base in rows. Each said arm has a resiliently deformable portion situated at an angle to the base member. The resilient portion and the base member form cooperative box engaging surfaces. A lip is situated at the end of the resilient portion and has a surface angled away from the plane of the resilient portion toward the base member. An elongated notch is situated between the lip surface and the resilient portion and has its major axis parallel to the plane of said base member surface. When two corner edges of one end said box are placed into contact with said box engaging surfaces formed by one of the arms and the base, and the box is pressed in a direction toward the arm, a third corner edge of the box will initially contact the lip surface at a point spaced from the notch and continuing pressure on the box will cause the resilient portion to be deformed to allow the third corner edge of the box to slide along the surface and snap into the notch, to hold the box in place.

11 Claims, 5 Drawing Figures ative box engaging surfaces, a lip situated at said second end of said resilient portion having a surface angled away from the plane of said resilient portion toward said base member, an elongated notch between said lip surfaces and said resilient portion having its major axis parallel to the plane of said base member surface; said

CASSETTE TAPE HOLDER

FIELD OF THE INVENTION

This relates to holders for tape cassettes particularly for use in vehicles.

BRIEF SUMMARY OF INVENTION

The present invention is intended to provide a device for securely holding a plurality of tape cassettes in boxes so that they will not be dislodged from the holder by normal vehicle motion and at the same time permitting the boxes containing the tape cassettes to be readily mounted on and removed from the holder. The device is further intended to provide a tape cassette holder wherein a substantial portion of the tape cassette boxes held by it are visible to the user.

In accordance with the present invention, there is provided a device for holding an article having three parallel corner edges, said device comprising, a base member having a surface; an arm, said arm comprising a resiliently deformable portion having first and second ends, said first end of said resilient portion joining said arm to said base, a lip situated at said second end of said resilient portion, a notch between said lip and said resilient portion; whereby when two corner edges of said article are placed in contact with the surface of the base and the arm a third corner edge will initially contact said lip at a point spaced from said notch.

In accordance with the present invention, there is further provided a device for holding a box having three parallel corner edges, said device comprising a base member having a generally planar surface; at least one arm on said base member, said arm comprising a resiliently deformable portion having first and second ends, said first end joining said arm to said base, said resilient portion being situated at an angle to said base member, said resilient portion and said base member forming box engaging surfaces, a lip situated at said second end of said resilient portion having a surface angled away from the plane of said resilient portion toward said base member, an elongated notch between said lip surface and said resilient portion having its major axis parallel to the plane of said base member surface; whereby when two corner edges of said box are placed into contact with said box engaging surfaces, and said box is pressed in a direction toward said arm a third corner edge of said box will contact with said lip surface, continuing pressure on the box will cause said resilient portion to be deformed to allow said third corner edge of the box to slide along said surface and snap into said notch.

In accordance with the present invention, there is further provided a device for holding tape cassette boxes having three parallel corner edges, said device comprising a base member having a generally planar surface; a plurality of arms positioned on said surface base member; each said arm comprising a resiliently deformable portion having first and second ends, said first end being attached to said base, said resilient portion being situated at an angle to said base member, said resilient portion and said base member forming cooperative box engaging surfaces, a lip situated at said second end of said resilient portion having a surface angled away from the plane of said resilient portion toward said base member, an elongated notch between said lip surfaces and said resilient portion having its major axis parallel to the plane of said base member surface; said arms being mounted in a row on said base surface; whereby when two corner edges of one end said box are placed into contact with said box engaging surfaces formed by one of said arms and said base, and said box is pressed in a direction toward said arm, a third corner edge of said box will initially contact said lip surface at a point spaced from said notch and continuing pressure on the box will cause said resilient portion to be deformed to allow said third corner edge of the box to slide along said surface and snap into said notch, to hold said box in place.

DESCRIPTION OF THE DRAWINGS

In drawings which disclose an embodiment of the invention.

DETAILED DESCRIPTION OF THE INVENTION

Figure 1:
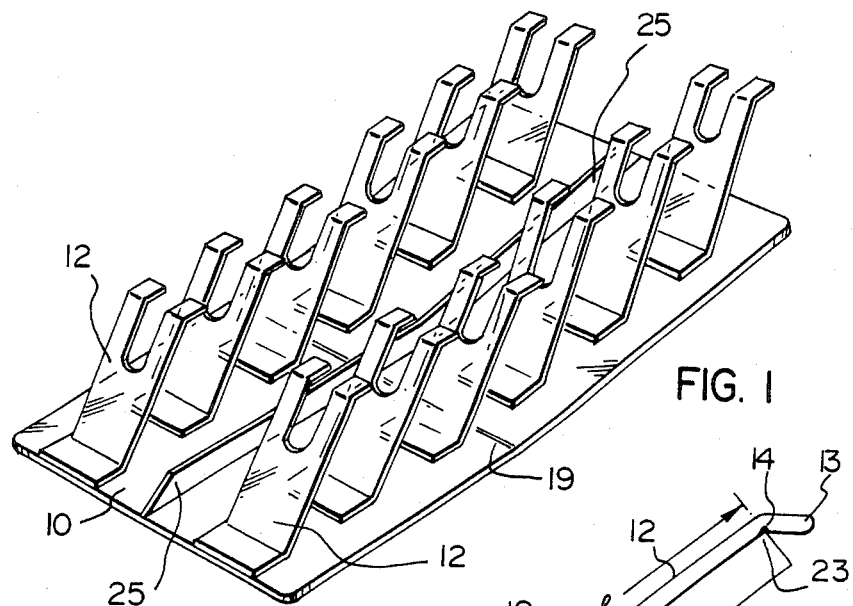
FIG. 1 is a perspective view of an embodiment of the holding device.

Referring to FIG. 1 it will be seen that the device consists of a generally planar base portion 10, upon which is mounted a number of arms 22 each of which is adapted to hold a tape cassette box. In some embodiments the base 10 may be angled along a line as shown at 19, so that the base is in two planes situated at an obtuse angle to one another. This permits the base to conform to the shape of the vehicle roof to permit ease of mounting of the holder to the vehicle roof.

Figure 2:
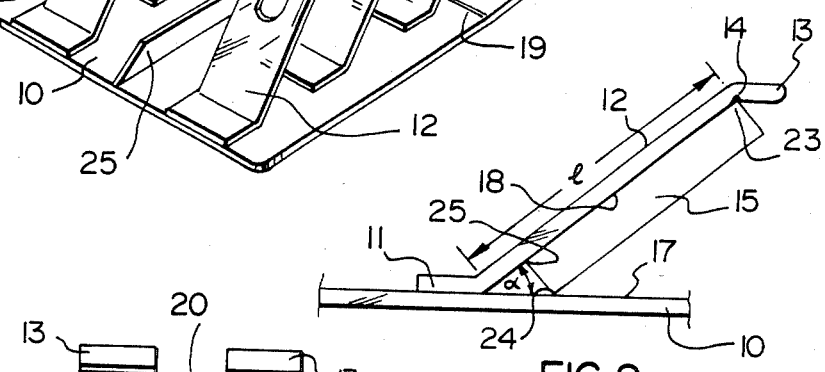
FIG. 2 is a side elevational view of a portion of the device shown in FIG. 1.
Figure 3:
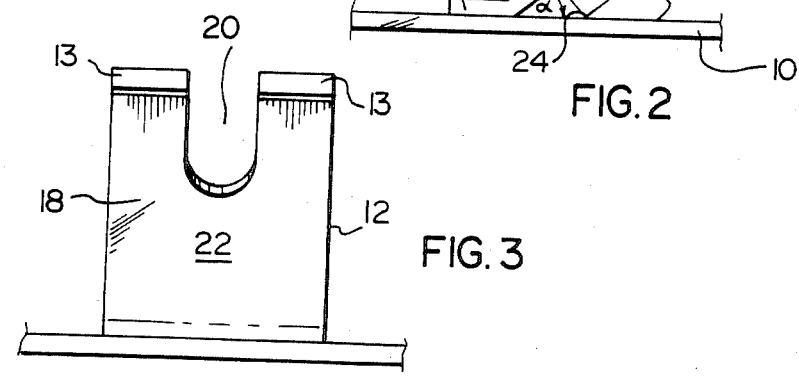
FIG. 3 is an end view of the portion shown in FIG. 2.

As shown in FIGS. 2 and 3, each arm 22 consists of a mounting portion 11 which is fixed to the base, an intermediate portion 12 and a lip 13. Along the line between the lip 13 and the intermediate portion 12 there is an elongated groove 14, the major axis of which is parallel to the plane of the base 10 in the area in which it is mounted.

The intermediate portion 12 is composed of a resilient material such as polyvinyl chloride, which tends to return it to its original shape when it is deformed within its elastic limit. The entire arm 22 may be constructed as an integral unit and is preferably composed of a transparent material. The base 10 may also be formed as an integral unit and the arms 22 attached to it, such as by cementing the mounting portion 11 to the surface of the base 10.

The end of the arm 22 remote from the base 11, has an opening 20 therein to permit the user to apply pressure against the box in a direction away from the arm, for the purpose of removing the box 15 from the holder.

Intermediate portions 12 of the arms 22 are situated at an acute angle to the portion of the base 10 upon which they are mounted. When the arm is undeformed, the length of the intermediate portion 12 and its angle $\alpha$ relative to the base 10 are such that when two corner edges 24 and 25, of box 15 are in contact with the base 10 and the intermediate portion 12, respectively, and the box 15 is moved toward the arm 22, a third corner edge of the box 23 will contact the surface 21 of the lip 13 at a point spaced from the notch 14. The surface 21 of the lip 13 is relatively smooth and unobstructed to permit the third corner edge to be slid toward the notch 14 by continued pressure on the box 15 in the direction toward the arm 22.

A central rib 25 provides added strength to the base 10 and assists in guiding the tape cassette boxes into position for attachment to the arms.

In practice it has been found that for mounting cassette tape boxes having dimensions 7 cm×11 cms×1.7 cm, the arms may be constructed of 0.5 cm clear polyvinyl chloride sheets with l=8.5 cm and α=45° and the lip 13 substantially parallel to the base 10.

In operation, the device may be mounted via the base 10 to the roof of a vehicle within reach of the operator with the V-shaped space between the base 10 and the arms 22 facing toward the rear of the vehicle. To attach a tape cassette box to the device the operator simply directs one end of the box toward an unoccupied opening. A first corner edge of the box will contact the base 10 and as the box continues to be moved inwardly a second corner edge will contact the arm 22. At this point, the user presses the outer end of the box toward the arm 22 until a third corner edge snaps into the groove 14.

Figure 4A:
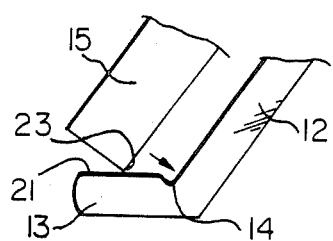
FIG. 4(a) and (b) are enlarged views of a portion of FIG. 2 shown in their mounted orientation.
Figure 4B:
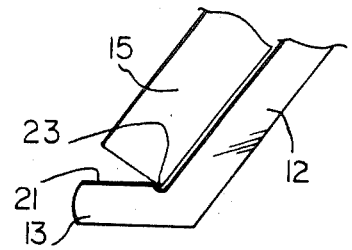

As shown in FIG. 4(a) when corner edges 24 and 25 of the box 15 contact the base 10 and the arm 22 respectively and the box is moved toward the arm 22 the outermost corner edge 23 of the box 15 adjacent the arm will initially contact the surface 21 of the lip 13 a short distance from the notch 14. As the user continues to press the box toward the arm 22 the intermediate portion 12 will be deformed by such pressure tending to increase the angle α. As a result, the distance between the notch 14 and the base surface 17 will increase until the corner edge 23 snaps into the notch 14 as shown in FIG. 4(b). In other words the notch 14 is adapted to receive the corner edge 23. In such position the box is held firmly in place and will not be dislodged by normal movement of the vehicle.

In an alternative construction the device may be formed from a single sheet with the arms and the base integral with one another. Specifically the unattached portions of the arms may be cut from the sheet and bent outwardly from the sheet which forms the base. The arms may be cut in a substantially V-shape to form a triangular arm with the base of the triangle forming the contact with the base and the apex area of the triangle folded to form the lip. The V-shape cut may extend into the area of an adjacent arm so that the folded arms have triangular openings in their centers and are generally V-shaped.

What I claim as my invention is:

1. A device for holding a box having three parallel corner edges, said device comprising a base member having a generally planar surface; at least one arm on said base member, said arm comprising a resiliently deformable planar portion having first and second ends, said first end joining said arm to said base member, said resilient portion being disposed at an acute angle to said base member, said resilient portion and said base member forming box engaging surfaces, a lip formed at said second end of said resilient portion having a surface angled away from the plane of said resilient portion toward said base member, an elongated notch between said lip surface and said resilient portion having its major axis parallel to the plane of said base member surface and said elongated notch adapted to receive a third corner edge of said box; whereby when two corner edges of said box are placed into contact with said box engaging surfaces, and said box is pressed in a direction toward said arm, said third corner edge of said box will contact with said lip surface, continuing pressure on the box will cause said resilient portion to be deformed to allow said third corner edge of the box to slide along said surface and snap said notch.

2. A device for holding tape cassette boxes having three parallel corner edges, said device comprising a base member having a generally planar surface; a plurality of arms positioned on said surface base member; each said arm comprising a resiliently deformable planar portion having first and second ends, said first end being attached to said base member, said resilient portion being disposed at an acute angle to said base member, said resilient portion and said base member forming cooperative box engaging surfaces, a lip formed at said second end of said resilient portion having a surface angled away from the plane of said resilient portion toward said base member, an elongated notch between said lip surface and said resilient portion having its major axis parallel to the plane of said base member surface; said arms being mounted in a row on said base surface and said elongated notch adapted to receive a third corner edge of said box; whereby when two corner edges of one end of said box are placed into contact with said box engaging surfaces formed by one of said arms and said base, and said box is pressed in a direction toward said arm, said third corner edge of said box will initially contact said lip surface at a point spaced from said notch and continuing pressure on the box will cause said resilient portion to be deformed to allow said third corner edge of the box to slide along said surface and snap into said notch, to hold said box in place.

3. A device according to claim 1 or 2 wherein there is an opening in said second end of said resilient portion and the adjacent portion of said lip, to permit a user to contact said box adjacent said opening to press said third edge out of said notch.

4. A device according to claim 1 or 2 wherein said lip surface is relatively smooth to permit said third edge surface to be slid toward said notch without obstruction.

5. A device according to claim 2 wherein said arm includes an integral extension at said first end of said resilient portion, said extension being attached to the base member to hold the arm in position.

6. A device according to claim 5 wherein said arm is formed as an integral unit and is composed of clear polyvinyl chloride.

7. A device according to claims 1 or 5 wherein said base member includes a first portion situated in a first plane and a second portion situated in a second plane, said first and second planes forming an obtuse angle therebetween to conform with the shape of a vehicle roof.

8. A device according to claim 1 or 2 comprising a plurality of said arms mounted on said base.

9. A device according to claim 1 wherein said arms are integral with said base and said arms and said base are formed from a single sheet of material.

10. A device according to claim 9 wherein said arms are formed by making V-shaped cuts in said sheet, bending the V-shaped cut portions out of the plane of said sheet and bending the apex area of the V-shaped cut portion to form said lip.

11. A device according to claims 1 or 10 wherein said arms are generally V-shaped.

* * * * *